United States Patent [19]

Geibel et al.

[11] Patent Number: 5,378,426
[45] Date of Patent: Jan. 3, 1995

[54] OXIDATION RESISTANT METAL PARTICULATES AND MEDIA AND METHODS OF FORMING THE SAME WITH LOW CARBON CONTENT

[75] Inventors: Stephen A. Geibel; John L. Hurley; Sandra L. Brosious, all of Cortland, N.Y.

[73] Assignee: Pall Corporation, East Hills, N.Y.

[21] Appl. No.: 964,266

[22] Filed: Oct. 21, 1992

[51] Int. Cl.⁶ .................... B22F 1/00; C22C 29/00
[52] U.S. Cl. ............................... 419/2; 419/11; 419/24; 419/29; 419/53; 75/230; 428/605; 428/607
[58] Field of Search .............. 419/2, 3, 4, 5, 10, 419/27, 8, 24, 26, 29, 53, 11; 428/550, 552, 553, 605, 607; 75/230

[56] References Cited

U.S. PATENT DOCUMENTS

| | | | |
|---|---|---|---|
| 1,365,499 | 1/1921 | Kelley | 419/2 |
| 1,677,979 | 7/1928 | Mitchell | 419/2 |
| 1,853,369 | 4/1932 | Marshall | 419/2 |
| 2,462,045 | 4/1942 | Wulff | 148/4 |
| 2,536,774 | 1/1951 | Samuel | 419/2 |
| 3,234,056 | 2/1966 | Kraft et al. | 29/419.1 |
| 3,485,595 | 12/1969 | Kraft et al. | 29/419.1 |
| 4,053,662 | 10/1977 | Bergez et al. | 427/250 |
| 4,155,755 | 5/1979 | Sara | 75/200 |
| 4,562,039 | 12/1985 | Koehler | 419/2 |
| 4,613,369 | 9/1986 | Koehler | 75/246 |
| 4,698,269 | 10/1987 | Narusch, Jr. et al. | 428/552 |
| 5,130,166 | 7/1992 | Spencer | 427/337 |
| 5,149,360 | 9/1992 | Koehler et al. | 75/228 |

FOREIGN PATENT DOCUMENTS

| | | |
|---|---|---|
| 181317 | 5/1986 | European Pat. Off. . |
| 386499 | 1/1933 | United Kingdom . |
| 603762 | 6/1948 | United Kingdom . |
| 686148 | 1/1953 | United Kingdom . |
| 1110852 | 4/1968 | United Kingdom . |
| 2006271 | 5/1979 | United Kingdom . |
| 2247249 | 2/1992 | United Kingdom . |

OTHER PUBLICATIONS

Redmond et al., "The Basics of Stainless Steels", Chemical Engineering, Oct. 18, 1982, pp. 79–93.
Kirk–Othmer, "Encyclopedia of Chemical Technology", 3rd ed., John Wiley & Sons (1981), vol. 15, pp. 262–271.
Kirk–Othmer, "Encyclopedia of Chemical Technology", 3rd ed., John Wiley & Sons (1981), vol. 6, pp. 66, 67, 80 & 81.
Burns et al, "Protective Coatings for Metals", 3rd ed., Reinhold Publishing Corp. (1928), pp. 280–285.
A. John Sedriks, "Corrosion of Stainless Steels", John Wiley & Sons (1979), p. 1721.
"Source Book on Stainless Steels", comp. by American Society for Metals, (1976), FIG. 2c.
"Metals Handbook", ed. Taylor Lyman, 1948 edition, American Society for Metals, pp. 705–706.
"Metals Handbook", ed. Lyman et al, 8th ed., American Society for Metals, vol. 2, pp. 492, 493, & 497.

Primary Examiner—Donald P. Walsh
Assistant Examiner—Anthony R. Chi
Attorney, Agent, or Firm—Leydig, Voit & Mayer

[57] ABSTRACT

Metal particulates and porous metal media, which have enhanced resistance to undesirable oxidation, and methods of producing the same are provided. The porous metal media comprise sintered metal particulates each typically having a core and a surface and a diameter in the range of 0.25 to 50 micrometers, the particulates comprising at least about 60 wt. % of a base metal including at least one of iron and nickel, at least about 11 wt. % chromium and no more than about 0.03 wt. % carbon. The surfaces of the particulates are enriched with at least one treatment element in an amount and depth sufficient to enhance the resistance of the particulates to undesirable oxidation. The invention also includes a fine metal filter medium formed from sintered metal fibers, which has enhanced resistance to corrosion and/or to high temperature oxidation. A method of enhancing the resistance of a porous metal medium to undesirable oxidation is also provided which includes heating a porous metal medium formed from sintered metal particulates having a diameter in the range of 0.25 to 50 micrometers and a composition comprising (a) at least about 60 wt. % of a base metal including at least one of iron and nickel, (b) at least about 11 wt. % chromium and (c) no more than about 0.03 wt. % carbon, in the presence of a pack composition comprising a treatment element, an activator and a diluent, at a temperature of at least about 700° C.

29 Claims, 1 Drawing Sheet

OXIDATION RESISTANT METAL PARTICULATES AND MEDIA AND METHODS OF FORMING THE SAME WITH LOW CARBON CONTENT

TECHNICAL FIELD OF THE INVENTION

The present invention relates to porous metal media, which are resistant to undesirable oxidation and to a method of producing the same. The invention is also directed to materials from which such media are formed and to a method of producing the same. In particular, the porous metal media include fine metal filter media, which are resistant to corrosion and/or high temperature oxidation.

BACKGROUND OF THE INVENTION

Metal filter media are used in a wide variety of applications due to their excellent structural integrity, versatility and ability to withstand high temperatures. In high temperature applications, metal media offer a significant advantage over ceramic filters due to the inherent brittleness of the latter. Most metals do not exhibit the same degree of brittleness, but rather show some degree of ductility, i.e., the metal can be stretched, drawn or hammered thin without breaking. Filter media formed from ductile metals are resilient and able to withstand shock or vibration.

Metal filter media can be produced in a wide variety of pore sizes and configurations and are typically formed by sintering fine metal particulates, such as metal particles or metal fibers. Fine metal fibers are particularly desirable, because metal fibers permit the formation of filter media which, despite having a very small pore size, have a low pressure drop ($\Delta p$). The production of such media may require the use of metal fibers with extremely small diameters, often as small as about 2 micrometers in diameter or within a range from about 1 to about 4 micrometers.

The type of application or lifetime of a metal filter medium, however, may be limited by the ability of the base metal to resist undesirable oxidation. For the purposes of this invention, undesirable oxidation is defined as a chemical reaction that alters the chemical and physical properties of a metal in a detrimental manner. Oxidation here has the meaning typically ascribed to it by a chemist, i.e., at least one metallic element in the alloy increases in its oxidation state or valence. Undesirable oxidation includes both corrosion and high temperature oxidation of a metal. A variety of conditions, including exposure to aqueous acid or halide-containing solutions, contact with corrosive gases and the combination of high temperatures with an oxidizing or sulfur-containing environment, can foster the development of undesirable oxidation reactions. Corrosion may occur in a variety of forms, including general corrosion, pitting and crevice corrosion (which occur particularly in high chloride environments), stress corrosion cracking, hydrogen embrittlement and intergranular corrosion. Hydrogen-assisted stress-cracking may develop when metal components are stressed in the presence of hydrogen or hydrogen sulfide. Undesirable oxidation may cause a buildup of oxidation products or the erosion of metal, thereby weakening the physical integrity of the filter medium. Ultimately, undesirable oxidation can result in failure of the medium due to cracking, channeling or clogging.

It is well known that the resistance to undesirable oxidation of a particular metal alloy may be improved by enriching the alloy with certain treatment metals, such as chromium, nickel or aluminum. The addition of chromium to a metal may provide increased resistance to general and pitting corrosion. Ferrous alloys containing varying amounts of aluminum show enhanced resistance to oxidation and sulfur attack at high temperatures. Nickel containing alloys are known to have good resistance to pitting and crevice corrosion and are often used in chloride containing environments. Titanium- or columbium-stabilized grades of stainless steel exhibit enhanced resistance to intergranular corrosion.

The sintering process used to form metal filter media places limitations on the metal alloys that may potentially be employed. Certain highly reactive elements, if present in even very minor amounts, will seriously interfere with the sintering process. For example, the presence of a few hundredths of a per cent of aluminum in an alloy will have an adverse effect on sintering and the presence of a few tenths of a percent of aluminum will make it difficult to sinter a material at all. Other elements, such as chromium, are especially prone to volatilize during vacuum sintering, thus making it difficult to maintain high concentrations of such elements. In addition, the high temperatures required for sintering will tend to result in the formation of filter media in which the alloy composition is substantially uniform throughout the profile of the sintered metal particulates. While increasing the amount of a specific element throughout the profile of the sintered metal particulates may enhance the resistance of the surface to undesirable oxidation, the physical properties of the core of the particulate may be adversely modified.

Unfortunately, for applications where enhanced resistance to undesirable oxidation is required, many alloys are simply not available as fine metal fibers. Difficulties with the drawing process (e.g., high work hardening rates, nonmetallic inclusions, carbides, precipitated phases, and refractory oxides) limit the diameter, to which a fiber of more heavily alloyed grades, can be drawn. For instance, Hastelloy X is not available in diameters finer than 8 micrometers. Similarly, Fecralloy is only commercially available with a minimum fiber diameter of 22 micrometers. Fine stainless steel fibers, having diameters of less than about 2 micrometers, are essentially only available in 316 L stainless steel.

The availability of metal filter media having a wider variety of higher alloy compositions would greatly increase the range of applications where such media could be employed. For some time, the electronics industry has had a need for fine filters capable of filtering the highly corrosive gases, such as chlorine, hydrogen chloride and tungsten hexafluoride, used in chip fabrication. The nuclear power industry requires fine filters able to withstand superheated water at temperatures of 300° to 350° C. Other industries have filter applications which involve exposure to high service temperatures (e.g., greater than 350° C.) in the presence of combustion gases or oxidizing environments such as air. High temperature gaseous environments having an appreciable sulfur content present a particularly difficult corrosion problem.

It would be particularly desirable if metal filter media formed from very fine metal fibers, with their inherently low pressure drop, were available in a wider range of alloys. There is a continuing need, therefore, for porous metal media that can be used in environments which cause undesirable corrosion. In particular, there is a need for fine metal filter media and the fibers from which such media are formed, having improved resistance to corrosion and/or high temperature oxidation.

SUMMARY OF THE INVENTION

The present invention is directed to a porous metal medium which has enhanced resistance to undesirable oxidation. The present invention further provides a fine sintered metal filter medium, preferably formed from metal fibers, which has enhanced resistance to corrosion and/or to high temperature oxidation. Such media have not been known heretofore because the fibers from which such media are formed, it is believed, were commercially unavailable. In other instances, where fibers are available, the composition of a particular alloy often may be such that the alloy cannot be successfully sintered.

The present invention provides metal particulates, which have a core and a surface and a diameter in the range of 0.25 to 50 micrometers. The metal particulates comprise (a) at least about 60 wt. % of a base metal including at least one of iron and nickel, (b) at least about 11 wt. % chromium and (c) no more than about 0.06 wt. % carbon and most preferably no more than about 0.03 wt. % carbon. At least the surfaces of the particulates are enriched with at least one treatment element in an amount and depth sufficient to enhance the resistance of the sintered metal particulates to undesirable oxidation. In contrast to a surface oxidation process, which produces a deposition of material onto the surface and would not typically result in any penetration beyond a depth of up to about 200 Å into the surface, the present invention affords sintered metal particulates which are enriched with a treatment element substantially deeper within the surfaces of the particulates. The amount and depth of enrichment will vary with the enriching treatment element, the alloy being enriched and the effect being sought.

According to another aspect, the present invention includes sintered porous metal media comprising the metal particulates described above. A preferred embodiment of the present invention provides a porous metal medium including sintered metal particulates, in which the surfaces of the particulates are enriched with at least one treatment element without substantially decreasing the ductility of the sintered metal particulates. The metal particulates are preferably metal fibers, more preferably stainless steel fibers.

In addition, the present invention is directed to a method of producing a porous metal medium which is resistant to undesirable oxidation. One embodiment of the present invention provides a method of producing a fine metal filter medium which is resistant to corrosion and/or high temperature oxidation. In a preferred embodiment, the resistance to corrosion and/or high temperature oxidation of a porous metal medium is enhanced without causing any substantial detrimental effects on the bulk physical properties of the medium, such as substantially decreasing the ductility or substantially increasing the brittleness of the metal. The method allows the introduction of a number of elements, such as zinc and cadmium, that are not available in alloys produced by conventional steel making techniques.

In addition, the present invention provides a method of enhancing the resistance of porous metal media to undesirable oxidation comprising sintering the metal particulates described above to form a porous metal medium and heating the porous metal medium in the presence of a pack composition at a temperature of at least about 700° C. The pack composition includes a treatment element, an activator and, optionally, a diluent.

Further, the present invention provides a method of enriching the surfaces of sintered metal fibers with a treatment element. The method includes heating the sintered metal fibers in the presence of a pack composition at a temperature of at least about 700° C. In another embodiment, a fine metal filter medium, which comprises sintered metal fibers, may be heated in the presence of a pack composition at a temperature of at least about 700° C. The metal fibers are preferably stainless steel fibers.

The present invention also provides a method of enhancing the resistance of a fine metal filter medium to undesirable oxidation comprising (a) sintering ferrous metal fibers comprising at least about 11 wt. % chromium and no more than about 0.06 wt. % carbon, to form a fine metal filter medium; and (b) heating the fine metal filter medium in the presence of a pack composition, at a temperature of at least about 700° C.

DETAILED DESCRIPTION OF THE INVENTION

Figure 1:
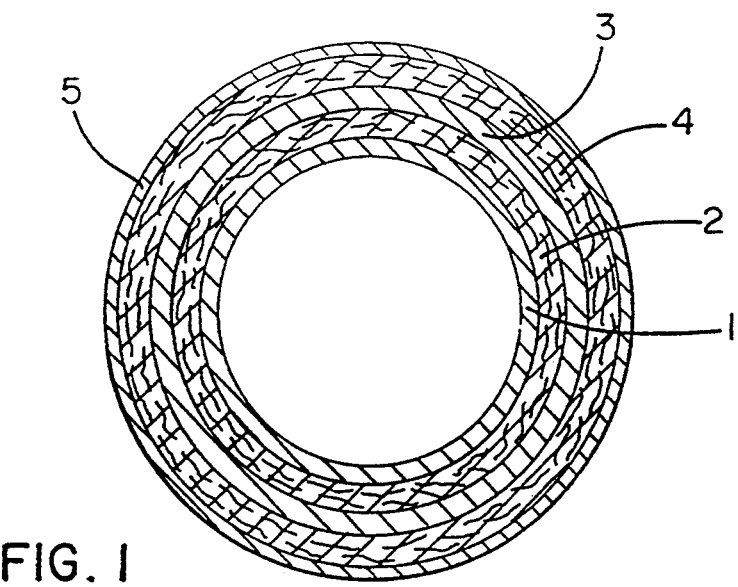
FIG. 1 shows a cross sectional view of one embodiment of a porous metal tube prepared for enrichment treatment according to the present invention.

According to one aspect, the present invention includes fine metal filter media comprising sintered metal particulates, which have a core and a surface. The metal particulates comprise (a) at least about 60 wt. % of a base metal including at least one of iron and nickel, (b) at least about 11 wt. % chromium and (c) no more than about 0.06 wt. % carbon. The surfaces of the particulates are enriched with at least one treatment element in an amount and depth sufficient to enhance the resistance of the sintered metal particulates to undesirable oxidation. Depending on the specific treatment element introduced to the surface of the metal particulates, the corrosion resistance and/or the resistance to high temperature oxidation of the filter medium is enhanced by the treatment. Preferably, the sintered metal particulates are fine metal fibers, more preferably stainless steel fibers. Preferably, the surfaces of the particulates are enriched with at least about 1 wt. % of a treatment element, based on the total composition of the treated metal particulates.

Surface treatment or enrichment in the present invention means treating or enriching the surface of particulate material to a depth (as measured from the surface) and in such a concentration of treatment element(s) as to achieve a substantial reduction or elimination of undesirable oxidation, particularly for the application in which the metal particulate or media formed from such particulate are used. Concomitantly, such particulate and/or media substantially retain their ductility (particularly as measured by the Ring Deformability Test or the Bend Ductility Test).

The metal particulates of the present invention include particulates which are suitable for use in forming a fine metal filter medium. Suitable metal particulates include metal fibers and metal particles, with metal fibers being preferred. The metal particulates of the present invention may be polycrystalline or may be a single crystal.

For the purposes of this invention, metal fibers are metal particulates which have an aspect ratio of at least about 100 to 1. The fibers may be filaments, which can be formed by drawing a metal through a fine die, such as a diamond die, or whiskers, which are single crystal fibers. The fibers typically have a diameter in the range of from 0.25 micrometer to 50 micrometers, preferably less than 30 micrometers, more preferably less than 12 micrometers and most preferably in the range of from 1 to 4 micrometers. The metal fibers, metal fiber mats and sintered media formed from metal fibers, which are used in this invention, are commercially available from a number of sources. Fibers of a suitable length and diameter may be selected to satisfy the intended application of the media. Typically, the fibers range in length from about 1/16" to about ½" and in some instances may be 2–3" in length. For specific applications longer or shorter fibers may also be used.

The metal particulates may also be in the form of fine metal particles, which do not have an aspect ratio of at least about 100 to 1. The metal particles are generally spheroidal in shape and may have an irregular surface. Typically, the average particle size is no more than about 150 micrometers. The fine metal particles preferably have an average particle size of no more than 40 micrometers and more preferably no more than 25 micrometers. In one embodiment of the present invention, a porous metal filter rated at 5 micrometers may be formed from a powder of 500 mesh particles, i.e., where 50% of the particles are less than 25 micrometers in size.

The metal particulates may be composed of a generally corrosion resistant metal, preferably of an iron or nickel based alloy. An iron-based metal (ferrous metal), such as stainless steel, is generally preferred from a cost standpoint and for its versatility and formability. The metal particulates of the present invention contain at least about 60 wt. % of a base metal including at least one of iron and nickel and at least about 11 wt. % chromium. In addition, the base metal may include from 0 to about 20 wt. % molybdenum. In a preferred embodiment, the metal particulates are composed of any readily sinterable stainless steel and more preferably comprise at least about 50 wt. % iron and at least about 11 wt. % chromium. Particularly preferred are metal fibers comprising stainless steel, such as 310 stainless steel or 316 L stainless steel.

It is known that the carbon content of a metal particulate greatly influences the corrosion resistance of a filter medium formed therefrom. If the carbon content is too high, carbides will tend to precipitate near the surface of the metal. The presence of surface carbides is highly detrimental to aqueous corrosion resistance. For the surface treatment of the present invention to be most effective, it is preferred that substantially all carbides that are present be dissolved prior to the high temperature introduction of the treatment element to the surface of the metal particulates. To ensure that this condition is achieved, metal particulates having a carbon content of no more than about 0.06 wt. % are typically used. Preferably, the carbon content of the metal particulates is no more than about 0.03 wt. %. The carbon content may be decreased to an even lower level by subjecting the metal particulates to an initial sintering step. It is also possible to employ metal particulates having a slightly higher carbon content, which is then reduced to the desired level by sintering.

In addition to lowering the carbon content, sintering the metal particulates results in the formation of bonds between adjacent metal particulates. This is necessary to fashion the particulates together into a filter medium. The formation of bonds between adjacent metal particulates does not substantially alter the particulates. The original shapes of the particulates are discernible even after the sintering step is completed. For example, sintering metal fibers to form a filter medium produces a fibrous metal matrix and does not fuse the fibers into a porous block of metal.

Sintering is generally carried out under a high vacuum or in a reducing atmosphere. Due to their high surface area, fine metal particulates are especially prone to the loss of some metals to volatilization during vacuum sintering. If sintering is carried out under high vacuum without a subsequent enrichment step), the filter medium that is formed may be more susceptible to corrosion due to the loss of a metal, such as chromium, from its surfaces. In such cases, the enrichment treatment of the present invention is particularly beneficial because it can restore a metal lost in sintering, and perhaps even more important, it can increase the content of that metal or another substance.

While the enrichment process of the present invention may be carried out on sintered metal particulates, preferably the enrichment is conducted with metal particulates that have been sintered into the form of a porous metal medium. More preferably, the enrichment is conducted with metal fibers that have been sintered into the form of a fine metal filter medium. As noted above, sintering can result in the loss of elements due to volatilization. In addition, the high temperature conditions required for sintering may lead to changes in the distribution of elements within the profile of a particulate. Accordingly, better overall control of the amount and depth of the enrichment process is maintained if the enrichment is conducted subsequent to sintering. By conducting the enrichment on particulates that have already been sintered into a medium, a final product may be produced, having an alloy composition that is not capable of being sintered without adverse results.

For the purposes of the present invention, "element" has the meaning ascribed to it by a chemist, i.e., in elemental or uncombined form. The treatment elements of the present invention can be chosen from a wide variety of elements recognized by those in the metallurgical art to enhance the resistance of a metal to undesirable oxidation, i.e., to enhance the corrosion resistance or high temperature oxidation resistance of a metal. The selection of a treatment element for a particular application may depend on other physical properties desired in the product as well as the degree of resistance to undesirable oxidation. Depending on the choice of treatment elements, the enrichment process may result in the enhancement of the corrosion resistance and/or high temperature oxidation resistance of a metal particulate.

Suitable treatment elements include metals such as chromium, nickel, molybdenum, copper, beryllium, vanadium, zinc, cadmium, silver and other noble metals, rhenium, tantalum, tungsten, aluminum, titanium, yttrium and rare earth metals. Of this group of metals, chromium, nickel, molybdenum, aluminum, vanadium, yttrium, rhenium and silver are preferred as treatment elements. Non-metallic treatment elements, such as silicon or nitrogen, may also be used to enhance the resistance of the metal particulates of the present invention to undesirable oxidation for certain applications. Among non-metallic treatment elements, silicon is preferred. Where enhancement of the corrosion resistance of metal particulates is desired, chromium, nickel, molybdenum, copper, beryllium, silicon, nitrogen, vanadium, zinc, cadmium, silver and other noble metals, rhenium, tantalum and tungsten are preferred. The addition of aluminum is especially effective in increasing the high temperature corrosion and oxidation resistance of a metal particulate. Because of the adverse effect of the presence of aluminum on the ability of an alloy to be sintered, the potential to enrich particulates with aluminum subsequent to sintering is especially advantageous. Chromium, nickel, silicon, molybdenum, titanium, yttrium and the rare earth metals are also preferred as treatment elements where an enhancement of the high temperature oxidation resistance of metal particulates is desired. Chromium, silicon and aluminum are most preferred as treatment elements.

Further, the addition of a number of treatment elements may have a beneficial effect on the resistance to specific types of corrosion of austenitic stainless steels exposed to chloride containing solutions. The enrichment of austenitic stainless steels with silicon, vanadium, chromium, nickel, molybdenum, nitrogen, silver or rhenium may enhance the resistance of the steels to pitting corrosion by chlorides. Enrichment with silicon, chromium, nickel, molybdenum, nitrogen and copper may enhance resistance of austenitic stainless steels to crevice corrosion in the presence of chlorides. Resistance to stress corrosion by chloride solutions may be increased by the enrichment of austenitic stainless steels with beryllium, silicon, nickel, copper, zinc or cadmium.

In an embodiment of the present invention, the surface of a metal particulate is enriched with at least one treatment element. The enrichment process is typically carried out using a single treatment element. In some instances, to achieve a required resistance to undesirable oxidation, to maintain a desired phase, to improve ductility, etc., it may be necessary to enrich the metal particulates with more than one treatment element. Where the introduction of more than one treatment element is desired, the treatment elements may be introduced simultaneously in a single enrichment step or sequentially in a series of enrichment steps.

The enrichment process comprises heating the metal particulate in the presence of a pack composition. While the enrichment process typically produces an increase in the surface concentration of the treatment element, an increase in the content of the treatment element throughout the profile of the metal particulate may also be achieved by varying the treatment conditions, e.g., temperature and exposure time (see the discussion below). For a particular application it may be desirable to achieve a greater depth of enrichment or a uniform enrichment throughout the particulate, e.g., the enrichment of austenitic stainless steels with silicon or nickel in order to enhance the resistance of the particulate to stress corrosion in chloride solutions. Where enrichment throughout the profile occurs, the amount of enrichment in the core of the particulate must be controlled to avoid any substantial detrimental effect on the bulk physical properties of the metal particulate.

In particular, care must be exercised to avoid a significant decrease in the ductility or a substantial increase in the brittleness of metal particulates or media. The addition of some elements to an iron-based metal alloy is known to lead to a decrease in the ductility (and an increase in the brittleness) of the metal. For example, brittleness may occur with an iron-based alloy when the chromium content exceeds about 35 wt. % due to a tendency of the resulting alloy to form a sigma phase. If aluminum or silicon is present as more than about 12 wt. % of a stainless steel alloy, the alloy may become insufficiently ductile due to the formation of an intermetallic phase ($Fe_3Al$ or $Fe_3Si$). Similarly, if a nickel-based alloy contains more than about 12 wt. % aluminum or silicon or more than about 30 wt. % molybdenum, the alloy may become insufficiently ductile due to the formation of an intermetallic phase ($Ni_3Al$, $Ni_3Si$ or $MoNi_4$).

If the ductility is substantially decreased, the ability of porous media formed from metal particulates to withstand shock or vibration will be adversely effected, making the media more prone to failure in many of the filtration applications in which such media are used. It has been found that the ability of a porous medium to withstand shock or vibration can be correlated with its ductility as measured by the Ring Deformability Test and the Bend Ductility Test (described below).

The Bend Ductility Test is typically used to evaluate the ductility of flat sheets of porous media. The procedure may be used to evaluate sheets formed from metal fibers or sheets formed from other metal particulates. For the purposes of this invention, elongation deformability is defined as the value of $\epsilon(\%)$ in the Bend Ductility Test at which fiber cracking is first observed. The elongation deformability is a relative measurement of the ductility (or lack of brittleness) of a metal. Media formed from sintered metal fibers retain sufficient ductility for use as filter media where a test coupon formed from the metal fibers has an elongation deformability of at least about 2.0%, and preferably at least about 3.5%.

The Ring Deformability Test may be used to evaluate the ductility of tubular porous metal media and is typically used to evaluate tubular porous media formed from sintered metal particles. The results of the Ring Deformability Test are expressed in terms of "ring deformability" (see Example 5 for definition), which is a relative measure of the ductility or lack of brittleness of metal media. A tubular porous metal medium according to the present invention retains sufficient ductility for use as a filter medium where a test ring of the porous metal medium has a ring deformability of at least about 3%, and preferably at least about 6%.

A metal particulate may have other bulk physical properties that would be desirable to maintain after the enrichment process. It may be possible to enhance the resistance of metal particulates to one type of corrosion by enriching the surfaces with a treatment element while maintaining an alloy composition, which confers enhanced resistance to a second type of corrosion, in the core of the particulates. For example, the resistance of sintered metal particulates to pitting corrosion may be enhanced by enrichment of the surfaces of the particulates with a treatment element, such as vanadium, while substantially maintaining the resistance of the core of the sintered metal particulates to another form of corrosion, such as general corrosion or stress corrosion cracking. As another example, steel alloys having more than about 15 wt. % chromium are quite resistant to corrosion by dilute nitric acid solutions (oxidizing conditions), while alloys having less than about 5–7 wt. % chromium are quite resistant to dilute sulfuric acid solutions (reducing conditions). Accordingly, metal particulates having surfaces enriched to a chromium content of more than about 15 wt. % and retaining less than about 5–7 wt. % chromium in the core, may exhibit surface resistance to corrosion in dilute nitric acid while retaining a core which is resistant to corrosion in dilute sulfuric acid.

The pack composition used to enrich the fibers and media of the present invention includes a treating metal and an activator. Preferably, the pack composition further includes a diluent. The components of the pack composition are typically in powder form. Preferably, the components are intimately mixed to achieve a uniform distribution of the components throughout the composition.

The relative amounts of the components in the pack composition may vary depending on a number of factors, such as the particular treatment element, the alloy being enriched and the amount and depth of treatment desired. The treating element is generally present from about 0.5 to about 50 wt. % of the total composition, preferably from about 0.5 to about 30 wt. %, more preferably from about 1.0 to about 15 wt. %. The diluent may be present as from about 40 to about 99 wt. % of the total composition, preferably from about 60 to about 98.5 wt. %. The activator may be present from about 0.1 to about 6 wt. % of the total composition, preferably from about 0.3 to about 4 wt. %.

The activator is a source of halide ions. Inorganic halides are generally suitable for use in the pack composition of the present invention, with chloride and fluoride salts being preferred. Suitable inorganic halides include ammonium salts, e.g., ammonium chloride, and alkali metal halide salts, such as sodium fluoride. It is believed that the function of the activator is to act as a chemical transfer medium. It is thought that the inorganic halide reacts with the treatment element to form a treatment element-halide species. The treatment element-halide species may then enter into displacement or disproportion reactions with the metal sample undergoing the enrichment treatment.

While the pack composition of the present invention may only contain a treating metal and an activator, a diluent is preferably included as well. The inclusion of a diluent enhances both the effectiveness and the efficiency of the enrichment process. Mixing the treating element with a diluent, which is typically in a powder form, prevents the pack composition from sintering into a solid. In addition, the use of a diluent allows the treating element to be uniformly distributed around the metal sample being treated without requiring excessive amounts of the treating element.

Any material that is non-reactive under the treatment conditions and, particularly, that is capable of withstanding high temperatures, preferably temperatures from about 700° C. to about 1150° C., without undergoing any substantial change is suitable for use as a diluent. Non-reactive ceramic materials, and in particular, refractory ceramics such as alumina, mullite (a stable form of aluminum silicate) and kaolin, are suitable for use as diluents.

In a preferred embodiment of the present invention, the enrichment process may be conducted with a barrier layer interposed between the metal sample undergoing treatment (porous medium or particulates) and the pack composition. The barrier layer serves to separate the metal sample from the pack composition. While the use of a barrier layer is recommended, it is not an essential requirement of the present invention. The barrier layer ensures that the components of the pack composition only contact the metal sample via the vapor phase. This enhances the effectiveness of the enrichment process and prevents the components of the composition from sintering with the sample. Porous materials, such as materials made from any refractory fiber which is non-reactive under the treatment conditions, may be suitably employed as a barrier layer. For example, the barrier layer may comprise an alumina fiber mat (Saffil fiber mat).

The amount, rate and depth of incorporation of a treatment element into a metal particulate may be controlled by varying the conditions of the enrichment process. One skilled in the art will be able to select appropriate conditions based on the alloy undergoing treatment, the enriching substance used, a general knowledge of solubility of a metal in other metals, and the discussion of various parameters below. Although the amount of treatment element (relative to the metal to be treated) will influence incorporation, the enrichment process is typically run with a large excess of the treatment element. The pack composition may generally be reused a number of times with the various components being replenished as they are depleted.

The temperature at which the enrichment process is conducted plays a very important role in determining the degree and type of incorporation. The enrichment process is typically run at temperatures in the range of from about 700° C. to about 1150° C., preferably from about 800° C. to about 1100° C. At lower temperatures, the enrichment of the treatment element occurs primarily at the surface of a metal particulate. Both the overall rate of incorporation and the depth of diffusion of the treatment element into the profile of a metal particulate increase as the temperature is increased. This is in part a result of differences in the solubility of metals as a function of temperature. For instance, above 900° C. the rate of diffusion of aluminum into iron rises abruptly.

While the rate of enrichment of a treatment element is primarily a function of temperature, the total incorporation is determined by both temperature and the exposure time. Similar overall incorporation may be achieved by using a short exposure time at high temperature or by conducting the enrichment treatment for a longer time at a lower temperature. As one skilled in the art will recognize, in combination with the temperature dependent solubilities of the metals involved, this allows variations in the profile or depth of enrichment for a given total incorporation of treatment element. Typical exposure times are in the range of from one half hour to 200 hours. With longer exposure time at high temperatures, an increase in diffusion of the treating element into core of particulate occurs, resulting in a more uniform distribution throughout the profile of a metal particulate.

The enrichment process is preferably carried out in a non-oxidizing atmosphere. Such an atmosphere may be achieved with either an inert gas, such as argon, or reducing gas, such as hydrogen. In particular, the atmosphere contains no oxygen or water, and, unless specifically desired, no nitrogen. Where the enrichment of an alloy with nitrogen as a treating element is desired, the nitrogen enrichment is conducted by simply exposing the alloy to nitrogen at an elevated temperature. Due to its gaseous nature, nitrogen cannot be incorporated as a component of a pack composition. Dissolved (interstitial) nitrogen may enhance the resistance of an alloy to pitting. Exposure to nitrogen at a high temperature may also result in formation of metal nitrides. The presence of precipitated nitrides is undesirable because it may render a metal susceptible to aqueous intergranular corrosion. The formation of precipitated nitrides may also lower ductility. For example, the concentration of nitrogen exceeds its solubility in stainless steel when the concentration of nitrogen approaches about 0.7 wt. %, and there is a tendency to form $Cr_2N$.

The process of the present invention may also comprise an additional step in which the surface of the metal particulate (or fine metal filter medium), that has been subjected to the enrichment treatment, is oxidized. The oxidation step typically comprises heating the enriched metal particulate or medium in the presence of air at a temperature of at least 350° C. Where the surface treated metal is a metal fiber, which has been surface-enriched in chromium, subsequent surface oxidation has been shown to improve the resistance to aqueous corrosion. In particular, the corrosion resistance of a surface-oxidized, chromium-enriched fiber in aqueous acid is improved, as judged by the amount of hydrogen evolved/unit of mass in the presence of a 10% hydrochloric acid solution.

The invention is susceptible to various modifications and alternative forms. For example, while the porous metal media of the present invention are preferably produced by the enrichment methods described above, one skilled in the art will recognize that the introduction of a treatment element may be realized by other methods. The incorporation of a treatment element into sintered metal particulates may be achieved by initially forming a coating, which includes the treatment element (or an appropriate precursor), on the surfaces of the particulates and subsequently heating the coated particulates to effect a substantial diffusion of the treatment element into the surfaces of the particulates. The coating step, which results in the deposition of material onto the surfaces of the particulates, may be carried out by a number of techniques, such as surface catalyzed decomposition, ion implantation, electroplating, electroless plating and sputtering. These coating techniques, which are conducted while maintaining the particulates at a relatively low temperature, do not result in the penetration of the treatment element to any substantial depth within the surfaces of the particulates. The subsequent heating step is required to effect substantial diffusion of the treatment element into the surfaces of the coated particulates. It is believed that the combination of a coating step with a subsequent heating step has not been used to enrich the content of a treatment element in a porous media formed from sintered metal fibers.

Certain specific embodiments of the present invention are described in the examples set forth below. These examples are offered by way of illustration and not by way of limitation.

EXAMPLE 1

Chromium Enrichment of Metal Fibers

Two samples of 316 L stainless steel metal fibers (2 micrometer diameter), which previously had been sintered into flat sheets, were wrapped in an alumina fiber mat. The total weight of the metal fibers was 2 g. The wrapped metal fibers were placed in a pack composition, which consisted of alumina (321 g), chromium (10 g) and ammonium chloride (2.5 g). The presence of the alumina fiber mat ensured that there was no direct contact between the metal fibers and the pack composition. The wrapped fibers and the pack composition were placed in a tube furnace. The furnace was evacuated, purged with argon and hydrogen was then introduced at a flow rate of 2 cubic feet per hour. The temperature of the furnace was raised to 950° C. and held at this temperature for 1.5 hours followed by cooling to room temperature.

The bulk chromium content of the two treated metal fiber samples was 32.6 wt. % and 30.3 wt. % (average-31.5 wt. %) as compared to a bulk chromium content of 17.6 wt. % for untreated control samples. Cross sections of both treated and untreated fibers were mounted in epoxy and polished metallographically. Scanning electron micrographs were taken together with x-ray electron spectroscopy (XES) scans to determine the composition of the fibers. The results (shown below in Table I) indicate a higher incorporation of chromium at the surface of the fiber and a substantial increase in chromium content throughout the profile of the fiber.

TABLE 1

|  | OUTSIDE SURFACE | ½ DIAMETER | CENTER |
|---|---|---|---|
| CHROMIUM TREATED | 29.76 | 24.28 | 23.37 |
| CONTROL (UNTREATED) | 16.39 | 16.69 | 16.75 |

EXAMPLE 2

Aluminum Enrichment of a Porous Metal Medium

Porous metal tubes made of fine 310 grade stainless steel powder (−500 mesh, 50% ≦24 micrometers) were vacuum sintered. The porosity of the tubes was rated at 5 micrometers (for use as filters in aqueous service). Each tube weighed 109 g. and was a cylinder 4 inches in length, 1.93 inches in diameter and had a wall thickness of 0.060 inches. Prior to treatment, stainless steel ends caps were welded to the ends of a tube.

The outside of tube wall 1 was wrapped with a first (inner) thin layer of alumina fiber mat 2 (see FIG. 1). This inner mat 2 was surrounded with a uniform layer of a pack composition 3 consisting of alumina (180.0 g), aluminum (33.8 g) and sodium fluoride (11.2 g). The layer of pack composition 3 was wrapped with a second (outer) layer of alumina fiber mat 4. The entire assembly was placed in an Inconel process tube 5 within a tube furnace. The furnace was evacuated, and subsequently backfilled and purged with argon. A flow rate of 0.25 cubic feet of argon per hour was then maintained from the outside to the inside of tube throughout the remainder of the treatment. The temperature of the furnace was raised to 982° C. and held at this temperature for 64 hours followed by cooling to room temperature. Analysis of the tube after treatment showed it to have an average bulk aluminum content of 10.3 wt. % as compared to no more than about 0.05 wt. % aluminum in an untreated control.

EXAMPLE 3

Chromium/Nickel Enrichment of Metal Fibers

A sample of 316 L stainless steel metal fibers (2 micrometer diameter), which previously had been sintered into a flat sheet, was wrapped in an alumina fiber mat. The total weight of the fibers was 1 g. The wrapped metal fibers were placed in a pack composition, which consisted of alumina (250 g), nickel (22.6 g), chromium (10 g) and ammonium chloride (2.3 g). The wrapped fibers and the pack composition were placed in a tube furnace. The furnace was evacuated, purged with argon and hydrogen was then introduced at a flow rate of 0.25 cubic feet per hour. The temperature of the furnace was raised to 950° C. and held at this temperature for 1.5 hour followed by cooling to room temperature.

The bulk chromium content of the treated metal fiber sample was 31.8 wt. % as compared to a bulk chromium content of 17.6 wt. % for unexposed fibers. The bulk nickel content of the treated fibers was 11.4 wt. % as compared to a bulk nickel content of 9.8 wt. % for unexposed fibers.

EXAMPLE 4

Bend Ductility Test

Metal coupons (typically 1" wide×3.5" long×0.08" thick) were cut to size and deburred. The ductility of a coupon was measured by wrapping the coupon around one end of a metal rod, having a specified diameter, while the other end of the rod was held in the jaws of a vise. The maximum strain on a coupon increases as the diameter of the rod decreases. The maximum fiber strain (elongation-$\epsilon$) for a given rod diameter (D) and coupon thickness ($\tau$) is given by the relationship:

$$\epsilon(\%) = \frac{100\,\tau}{(D + \tau)}$$

Initially, a coupon was bent around a rod having a relatively large diameter. The coupon was then bent around rods of successively smaller diameter and any cracking was noted.

The Bend Ductility test was run using two different coupons, a coupon cut from the sheet of sintered fibers prepared according to Example 3 and a coupon cut from the material which was the unexposed control (i.e., starting material) for Example 3. The results are shown below.

The results in Table 2 demonstrate that both the control coupon and the coupon subjected to the enrichment treatment of the present invention had appreciable ductility. Accordingly, the enrichment of sintered 316 L stainless steel fibers to achieve a chromium content of 31.8 wt. % and a nickel content of 11.4 wt. % did not result in a substantial decrease in the ductility of the fibers.

TABLE 2

| | FIBER CRACKING Appearance of Cracks | | |
|---|---|---|---|
| $\epsilon$ (%) | Higher Cr & Ni (Example 3) | Control | Rod Diameter (inch) |
| 3.8 | None | None | 2.00 |
| 4.8 | None | None | 1.58 |
| 6.0 | None | None | 1.25 |
| 7.9 | Minor (.1") | None | .93 |
| 10.3 | More Minor | None | .70 |
| 17.6 | Some gross (not through thick) | Minor (.063") | .38 |
| 24.2 | More gross (not through thick) | Minor | .25 |

EXAMPLE 5

Ring Deformability Test

Figure 2:
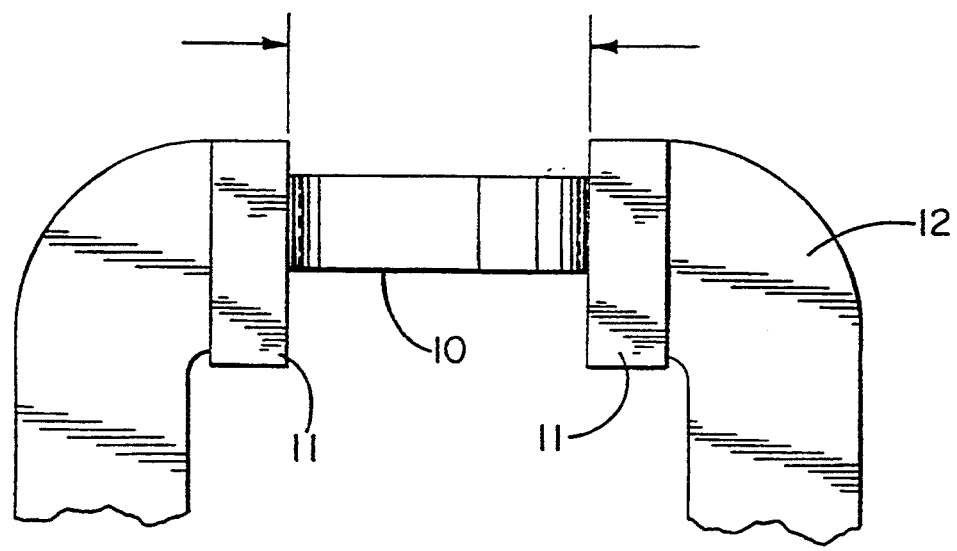
FIG. 2 shows a schematic view of a metal ring undergoing a Ring Deformability Test.

A 316 stainless steel porous metal ring 10 (2" diameter×0.5" wide×0.062" wall thickness) was cut from a porous metal tube, formed from sintered metal particles. Any burrs on the edges of the metal ring 10 were removed with a rat-tail file and sandpaper. The deburred ring 10 was placed between the jaws 11 of a 4" or 5" Flat-Face Soft Jaws Bench Vise 12. The vise jaws 11 were slowly and uniformly closed until an initial crack in the metal ring 10 was observed (as shown in FIG. 2). The initial crack was no more than 1/16" in length, visible to the naked eye at a maximum distance of one foot and was not caused by the cut-off or grinding procedures. The distance between the jaws 11 at the appearance of the initial crack was measured (initial crack distance). The per cent compression at initial crack appearance, relative to the initial diameter of the ring 10, was reported as the "ring deformability" of the metal ring.

$$\text{Ring Deformability} = \frac{\text{(Initial Diameter} - \text{Initial Crack Distance)}}{\text{(Initial Diameter)}}$$

The ring deformability of the 316 stainless steel porous metal ring was 19.2%.

EXAMPLE 6

Flat Sheet Deformability Test

The surfaces of a metal coupon (1" wide×3.5" long×0.005–0.2" thick) are ground as parallel as possible and any burrs on the edges are removed with a rat-tail file and sandpaper. The grinding of the facial surfaces is carried out using either 120 grit sandpaper on a flat plate or with a surface grinder.

The end of a 0.93" diameter round bar is secured between the jaws of a 4" or 5" Flat-Face Soft Jaws Bench Vise. One end of the surface ground, deburred coupon is contacted with the round bar and the coupon is slowly wrapped around the circumference of the open end of the bar. The performance of the metal coupon is evaluated using the rating system listed below. The flat sheet deformability test is typically used to evaluate sheets formed from metal fibers but the procedure may also be used to evaluate flat sheets of porous media formed from other metal particulates.

| Ductility Rating | Corresponding Visual Inspection |
|---|---|
| 0 | no cracking |
| 1 | minor cracking |
| 2 | some gross cracking |
| 3 | substantial gross cracking |
| 4 | complete fracture |

Although the present invention has been described in terms of exemplary embodiments, it is not limited to these embodiments. Alternative embodiments, examples, and modifications which would still be encompassed by the invention may be made by those skilled in the art, particularly in light of the foregoing teachings. Therefore, the following claims are intended to cover any alternative embodiments, examples, modifications, or equivalents which may be included within the spirit and scope of the invention as defined by the claims.

What is claimed is:

1. A porous metal medium comprising sintered metal particulates each having a core, a surface and a diameter in the range of 0.25 to 50 micrometers, the particulates comprising (a) at least about 60 wt. % of a base metal including at least one of iron and nickel, (b) at least about 11 wt. % chromium and (c) no more than about 0.03 wt. % carbon, wherein the surfaces of the particulates are enriched with at least one treatment element in an amount and depth sufficient to enhance the resistance of the sintered metal particulates to undesirable oxidation.

2. The porous metal medium of claim 1 wherein the sintered metal particulates comprise sintered metal fibers.

3. The porous metal medium of claim 2 wherein the sintered metal fibers have a diameter of 1 micrometer to 4 micrometers.

4. The porous metal medium of claim 2 wherein the sintered metal fibers comprise at least about 50 wt. % iron.

5. The porous metal medium of claim 2 wherein the sintered metal fibers comprise stainless steel fibers.

6. The porous metal medium of claim 5 wherein the treatment element is chromium.

7. The porous metal medium of claim 5 wherein the treatment element is aluminum.

8. The porous metal medium of claim 2 wherein the surfaces of the fibers are enriched with at least about 1 wt. % of a treatment element, based on the total composition of the treated metal fibers.

9. The porous metal medium of claim 1 wherein the treatment element is chromium, nickel, molybdenum, copper, beryllium, vanadium, zinc, cadmium, silver and other noble metals, rhenium, tantalum, tungsten, aluminum, titanium, yttrium or rare earth metals.

10. The porous metal medium of claim 1 wherein the treatment element is chromium, nickel, molybdenum, silicon, aluminum, vanadium, yttrium, rhenium or silver.

11. The porous metal medium of claim 1 wherein the treatment element is chromium, silicon or aluminum.

12. The porous metal medium of claim 1 wherein the base metal comprises no more than about 20 wt. % molybdenum.

13. The porous metal medium of claim 1 wherein the sintered metal particulates comprise sintered metal particles.

14. A porous metal medium including sintered metal particulates having diameters in the range of 0.25 to 50 micrometers and comprising (a) at least about 60 wt. % of a base metal including at least one of iron and nickel, (b) at least about 11 wt. % chromium and (c) no more than about 0.03 wt. % carbon, wherein the metal particulates are enriched with at least one treatment element in an amount sufficient to enhance the resistance of the sintered metal particulates to undesirable oxidation.

15. A metal particulate having a core, a surface; and a diameter in the range of 0.25 to 50 micrometers and comprising (a) at least about 60 wt. % of a base metal including at least one of iron and nickel, (b) at least about 11 wt. % chromium and (c) no more than about 0.03 wt. % carbon, wherein the surfaces of the metal particulate are enriched with at least one treatment element in an amount and depth sufficient to enhance the resistance of the metal particulate to undesirable oxidation.

16. The metal particulate of claim 15 wherein the treatment element is at least one of chromium, nickel, molybdenum, silicon, aluminum, vanadium, yttrium, rhenium or silver.

17. A method of enhancing the resistance of a porous metal medium to undesirable oxidation comprising, heating a porous metal medium formed from sintered metal particulates having a diameter in the range of 0.25 to 50 micrometers and a composition comprising (a) at least about 60 wt. % of a base metal including at least one of iron and nickel, (b) at least about 11 wt. % chromium and (c) no more than about 0.03 wt. % carbon, in the presence of a pack composition comprising a treatment element, an activator and a diluent, at a temperature of at least about 700° C.

18. The method of claim 17 wherein the metal particulates are stainless steel fibers.

19. A method of enhancing the resistance of a fine metal filter medium to undesirable oxidation comprising:
a) sintering metal fibers having diameters in the range of 0.25 to 50 micrometers and comprising (a) at least about 60 wt. % of a base metal including at least one of iron and nickel, (b) at least about 11 wt. % chromium and (c) no more than about 0.03 wt. % carbon, to form a fine metal filter medium; and
b) heating the fine metal filter medium in the presence of a pack composition, which comprises a treatment element, an activator and a diluent, at a temperature of at least about 700° C.

20. The method of claim 19 wherein the activator is an inorganic halide.

21. The method of claim 20 wherein the inorganic halide is an inorganic chloride or fluoride.

22. The method of claim 19 wherein the diluent is a non-reactive refractory material.

23. The method of claim 19 wherein the fine metal filter medium and the pack composition are separated by a non-reactive refractory barrier layer.

24. The method of claim 19 comprising heating the sintered metal particulate in the presence of the pack composition in a non-oxidizing atmosphere.

25. The method of claim 19 comprising heating the fine metal filter medium in the presence of the pack composition at a temperature in the range of 700° to 1150° C. for from 0.5 to 200 hours.

26. The method of claim 19 wherein the ratio of activator to treatment element in the pack composition is from 0.05 to 0.50.

27. The method of claim 19 wherein the pack composition comprises from about 0.5 to about 50 wt. % of the treatment element, from about 0.1 to about 6 wt. % of the activator and from about 40 to about 99 wt. % of the diluent.

28. The method of claim 19 further comprising oxidizing the surface of the surface treated fine metal filter medium.

29. The method of claim 19 wherein the fibers have diameters in the range of 1 to 4 micrometers.

* * * * *